United States Patent [19]

Carico et al.

[11] Patent Number: 4,972,015
[45] Date of Patent: Nov. 20, 1990

[54] THERMOFORMED POLYESTER ARTICLES

[75] Inventors: Joey C. Carico; Wayne P. Pruett; Raymond N. Vachon, all of Kingsport, Tenn.

[73] Assignee: Eastman Kodak Company, Rochester, N.Y.

[21] Appl. No.: 383,467

[22] Filed: Jul. 24, 1989

[51] Int. Cl.$^5$ ............................................. C08K 5/36
[52] U.S. Cl. .................... 524/303; 524/291; 524/304; 524/342; 524/417
[58] Field of Search .............. 524/291, 342, 417, 302, 524/303, 304, 604

[56] References Cited

U.S. PATENT DOCUMENTS

| | | | |
|---|---|---|---|
| 3,305,604 | 2/1967 | Armstrong et al. | 260/860 |
| 3,479,319 | 11/1969 | Hergenrother et al. | 524/417 |
| 3,516,957 | 6/1970 | Gray et al. | 528/207 |
| 3,904,578 | 9/1975 | Kawase et al. | 524/604 |
| 3,960,807 | 6/1976 | McTaggart | 260/40 R |
| 4,456,723 | 6/1984 | Breitenfellner et al. | 524/417 |
| 4,463,121 | 7/1984 | Gartland et al. | 524/291 |
| 4,474,918 | 10/1984 | Seymour et al. | 524/342 |
| 4,699,942 | 10/1987 | Weaver et al. | 524/304 |

FOREIGN PATENT DOCUMENTS

| | | | |
|---|---|---|---|
| 0264143 | 4/1988 | European Pat. Off. | 524/417 |
| 55-45118 | 3/1980 | Japan | 524/417 |
| 1241214 | 8/1971 | United Kingdom. | |

*Primary Examiner*—Veronica P. Hoke
*Attorney, Agent, or Firm*—John F. Stevens; William P. Heath, Jr.

[57] ABSTRACT

Disclosed is a shaped, thin-walled, thermoformed, heat-set article, the composition of which comprises:

(a) a crystallizable polyester having repeating units from at least 90 mol % terephthalic acid and repeating units from at least 90 mol % 1,4-cyclohexanedimethanol, the total dicarboxylic acid mol % and the total glycol mol % each being 100 mol %, said polyester having an inherent viscosity of about 0.7–1.1, and (b) a heat stabilizing amount of an antioxidant system comprising a hindered phenol, a thio ester or ether and a phosphate salt.

9 Claims, No Drawings

THERMOFORMED POLYESTER ARTICLES

TECHNICAL FIELD

This invention relates to thermoformed, heat-set articles produced from high molecular weight polyesters containing repeating units from terephthalic acid and 1,4-cyclohexanedimethanol. The articles also contain the combination of antioxidants as described herein.

BACKGROUND OF THE INVENTION

There is presently a need for ovenable food trays capable of withstanding high temperatures. Most conventional home ovens are calibrated to only about ±50° F., and may reach temperature during use of up to about 450° F. It is desirable that the containers do not lose impact strength, dimensional stability or discolor, so that they may be reused.

Normally, the ovenable containers are thermoformed from a polymeric material. In thermoforming, a sheet of material is preheated to a temperature sufficient to allow the deformation thereof. The sheet is then made to conform to the contours of a mold by such means as vacuum assist, air pressure assist and matched mold assist. Thermoforming is a desirable method of producing thin wall articles.

Conventional materials used to produce thermoformed articles such as food trays include polymers such as polyethylene terephthalate. U.S. Pat. No. 3,960,807 teaches a process for thermoforming articles from a composition comprising a crystallizable polyester, a crack stopping agent and a nucleating agent. The crack stopping agent improves impact strength, and the nucleating agent provides faster crystallization. Crystallization is necessary to achieve high temperature stability.

Also of interest in U.S. Pat. No. 4,463,121 which teaches thermoforming thin-walled articles from a composition consisting of polyethylene terephthalate, a polyolefin and optionally, a heat stabilizer such as a hindered phenol. This patent teaches "higher molecular weights, as measured by increased intrinsic viscosities tend to display greater strength than lower molecular weight polyesters. When working with moderate and high molecular weight polyesters, higher crystallinity is used to increase tensile strength; however, flexural properties then diminish and the polyester becomes stiff and brittle. For any particular use of polyesters, therefore, the particular composition of materials and parameters must be carefully selected". Certain phosphate salts are known stabilizers for vinyl polymers in which they act as acid acceptors. However, it is not believed to be known in the art that they are effective antioxidants for polyesters.

Applicants have now discovered that selected phosphate salts, namely $CaHPO_4$ and $Na_2HPO_4$, provide improved thermo-oxidative stability to articles thermoformed from polyesters described herein. Applicants have discovered an article thermoformed from a high molecular weight polyester having high tensile strength, yet having the ability to retain its flexibility and impact resistance when subjected to high oven temperatures. In these articles, it is necessary that the polyester contain repeating units from particular dicarboxylic acids(s) and a particular glycol, and have a high inherent viscosity indicating high molecular weight. In accordance with this invention, the article contains a heat stabilizer system which will prevent brittleness when subjected to high oven temperatures. Furthermore, articles thermoformed from the polyesters in accordance with this invention retain their toughness even after being subjected to very low temperatures (about −20° F.) following being subjected to high oven temperatures of about 450° F. Contrary to the teachings of the art with polyethylene terephthalate, crack stopping agents or impact strength-improving additives are not necessary with the present invention.

DISCLOSURE OF THE INVENTION

It has now been found that certain phosphate salts, when used in combination with hindered phenols and thio ethers or esters provide stability comparable to that obtained using commercially available phosphorous compounds such as phosphites.

According to the present invention, there is provided a shaped, thin-walled, thermoformed, heat-set article, the composition of which comprises:
(a) a crystallizable polyester having repeating units from at least 85 mol % terephthalic acid and repeating units from at least 90 mol % 1,4-cyclohexanedimethanol, the total dicarboxylic acid mol % and the total glycol mol % each being 100 mol %, said polyester having an inherent viscosity (I.V.) of about 0.7-1.1, and
(b) a heat stabilizing amount of an antioxidant system comprising a hindered phenol, a thio ether or ester, and calcium phosphate or sodium phosphate.

Preferably, the polyesters may also contain up to about 15 mol % repeating units from isophthalic acid. The polyester may also be modified with small amounts (less than about 10%) of other conventional dicarboxylic acids and aliphatic or alicyclic glycols. Other dicarboxylic acids which may be used include aliphatic, cycloaliphatic or aromatic acids having 2 to 20 carbon atoms, and aliphatic or cycloaliphatic glycols having 2 to 12 carbon atoms. These polyesters may be produced using conventional polyesterification procedures described, for example, in U.S. Pat. No. 3,305,604 and U.S. Pat. No. 2,901,460 the disclosures of which are incorporated herein by reference. Of course, esters of the acids (e.g., dimethyl terephthalate) may be used in producing the polyesters. It is also very desirable in the present invention for the I.V. of the polyester to be high, i.e., in the range of about 0.87-1.1. Preferably, the high I.V.'s are attained by melt phase polymerization followed by conventional solid state polymerization.

The polyesters described herein for use in producing thermoformed articles have high melting temperatures, but they tend to oxidize at the high temperatures which may be encountered by food trays. Thus, it is necessary to include a heat stabilizing amount of an antioxidant in the thermoforming compositions. In accordance with another aspect of this invention, a particular blend of a hindered phenol, a thio ether or this ester, and a phosphate salt provide unexpected results when used as antioxidants with the particular polyester described herein. These materials are known, of course, as stabilizers, but the particular combination used by applicants is not believed to be suggested in the art. For example, U.S. Pat. No. 4,463,121 discloses a number of such antioxidants useful in polyethylene terephthalate.

Hindered phenol antioxidants are also commercially available. One suitable hindered phenol is Irganox 1010 antioxidant, marketed by Ciba-Geigy. Its chemical name is tetrakis[methylene-3-(3′,5′-di-tert-butyl-4′ -hydroxyphenyl)propionate] methane. These hindered phenols have the general formula

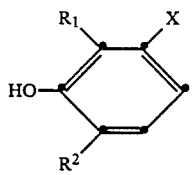

wherein $R_1$ is a branched alkyl group containing 3-20 carbon atoms, $R_2$ is H or a straight or branched alkyl group containing 1 to 20 carbon atoms, and X is an alkyl group or an electron donating group.

Other hindered phenols useful in the present invention include 1,3,5-tris(3,5-di-tert-butyl -4-hydroxybenzyl)-5-triazine-2,4,6-(1H, 3H, 5H)trione; 3,5-di-tert-butyl-4-hydroxyhydrocinnamic acid triester with 1,3,5-tris(2-hydroxyethyl)-S -triazine-2,4,6-(1H, 3H, 5H)-trione; octadecyl 3,5-di-tert-butyl-4-hydroxyhydrocinnamate; thiodiethylene bis-(3,5-di-tert-butyl-4hydroxy)-hydrocinnamate; N,N'-hexamethylene bis(3,5-di-tert-butyl-4-hydroxy-hydrocinnamamide); 1,6-hexamethylene bis(3,5-di-tert-butyl-4-hydroxyhydrocinnamate); 1,3,5-trimethyl-2,4,6,-tris(3,5-di-tert-butyl-4-hydroxybenzyl)benzene; 2,4-bis(n-octylthio) -6(4-hydroxy-3,5-di-tert-butylanilino)-1,3,5-triazine; n-octadecyl 3,5-di-tert-butyl-4-hydroxyphenylacetate; 1,3,5-tris(4-tert-butyl-3-hydroxy-2,6-dimethylbenzyl)- c 1,3,5-triazine-2,4,6-(1H, 3H, 5H)trione; 2,2'-methylenebis(4-ethyl-6-tert -butylphenol); 2,2'-methylenebis(4-methyl-6-tert-butylphenol); 4,4'-methylenebis(2,6-di-tert-butylphenol); 4,4'-thioibis(6-tert-butyl-o-cresol); 3:1 condensate of 3-methyl-6-tert-butylphenol and crotonaldehyde; 4,4'-butyldienebis(6-tert-butyl-m-cresol)3,5-di-tert-butyl-4-hydroxybenzyl ether; 2,2'-oxamidobis ethyl-3 (3,5-di-tert-butyl-4-hydroxyphenyl)propionate; stearyl $\beta$-(3,5-di-tert-butyl-4-hydroxyphenyl)propionate; distearyl 3-methyl-4-hydroxy.5-tert-butylbenzyl malonate; 4,4'-propylmethylenebis(2-tert-butyl-5methylphenol); 2,2,-propylmethylenebis(4,6-dimethylphenol); 2,2,-methylenebis(4,6,-di-tert-butylphenol); 1,4-bis(3',5',di-tert-butyl-4'-hydroxybenzyl) 2,3,5,6tetramethylbenzene; 1,1-bis(3'-cyclohexyl-4'hydroxyphenyl)cyclohexane; 2,6-bis(2'-hydroxy-3'-tert-butyl-5'-methylphenyl)-4-methylphenol; 2,4,6-tris(($\beta$-3',5'-dibutyl-4'-hydroxyphenyl)ethyl)-1,3,5-triazine; (2,4,6-tris(3',5'-di-tert-butyl-4'-hydroxybenzyl)phenol.

The useful thio ethers and this esters include esters of thiodipropionic acid, preferably dilauryl thiodipropionate and distearyl thiodipropionate.

The useful phosphate salts include calcium phosphate ($CaHPO_4$) and sodium phosphate ($Na_2HPO_4$), both of which are commercially available.

Preferably, the hindered phenol is used in amounts of about 0.05-2% based on the weight of the article. The phosphate salt is present in an amount of about 0.01 to 0.20% based on the weight of the article. The thiodipropionate may be present in an amount of about 0.05-1.0% based on the weight of the article. These antioxidants may be added to the polyester separately or as a mixture.

The addition of nucleating agents provide faster crystallization during thermoforming and thus provide for faster molding. Conventional nucleating agents such as fine particle size inorganic or organic materials may be used. Suitable nucleating agents include talc, titanium dioxide, calcium carbonate, polymers, etc. Normally, nucleating agents are used in amounts varying from about 0.01% to about 20%, based on the weight of the article.

Other conventional additives such as pigments, dyes, plasticizers, various stabilizers, etc., may be used as desired.

Ordinary thermoforming techniques known to those skilled in the art may be used in producing the articles of this invention. Generally, the technique consists of the following steps:

1. Forming a substantially amorphous sheet from the composition.
2. Preheating the sheet until it softens and positioning it over the mold.
3. Drawing the preheated sheet onto the heated mold surface.
4. Heatsetting the formed sheet by maintaining sheet contact against the heated mold for a sufficient time period to partially crystallize the sheet.
5. Stripping the part out of the mold cavity.

The sheeting and film for use in the thermoforming process can be made by any conventional method. The most common method being by extrusion through a flat die. It is important that the sheet or film be quenched immediately after extrusion in order to minimize the extent of crystallization developed after forming.

The term substantially amorphous as used herein shall mean a sheet having a level of crystallinity low enough to enable thermoforming of the sheet to be accomplished with satisfactory mold definition and part formation.

The preheating of the substantially amorphous sheet prior to positioning over the thermoforming mold is necessary in order to achieve the very short molding times required for a viable commercial process. The sheet must be heated above its Tg and below the point at which it sags excessively during positioning over the mold cavity.

This invention can be practiced by using any of the known thermoforming methods including vacuum assist, air assist, mechanical plug assist or matched mold. The mold should be preheated to a temperature sufficient to achieve the degree of crystallinity desired. Selection of optimum mold temperature is dependent upon type of thermoforming equipment, configuration and wall thickness of article being molded and other factors.

Heatsetting is a term describing the process of thermally inducing partial crystallization of a polyester article without appreciable orientation being present. In the practice of this invention, heatsetting is achieved by maintaining intimate contact of the film or sheet with the heated mold surface for a sufficient time to achieve a level of crystallinity which gives adequate physical properties to the finished part. It has been found that desirable levels of crystallinity should be about 10 to about 30 percent.

The heat set part can be stripped out of the mold cavity by known means for removal. One method, blowback, involves breaking the vacuum established between the mold and the formed sheet by the introduction of compressed air. In commercial thermoforming operation the part is subsequently trimmed and the scrap ground and recycled.

Experience with lower I.V. (0.76 I.V.) polyethylene terephthalate, suggests that solid-stating to an I.V. of about 1.00 would produce a copolyester having a molecular weight comparable to a 0.84 I.V. polyethylene terephthalate and should be significantly tougher when exposed to the high cooking temperatures of 450° F. It has been found, unexpectedly, that in addition to increasing the toughness of the copolyesters used in the present invention at 450° F., this toughness is maintained at 0° F. even after the tray has been used for cooking and subsequently frozen. This does no occur with high molecular weight polyethylene terephthalate. Furthermore, the toughness of the copolyesters used in the present invention are maintained to temperatures as low as about −20° F.

The following examples are submitted for a better understanding of this invention.

Stabilizer/nucleator concentrates are prepared using a Brabender PlastiCorder mixer using 58.5% polypropylene as a carrier, 8.0% Irganox 1010 antioxidant (hindered phenol), 1.5% CaHPO4 (phosphate salt), 12% distearyl thiodipropionate, and 20% titanium dioxide as a nucleator. A pellet-to-pellet blend is then prepared using polyester and concentrate. The polyester used is Polyester A which has an I.V. of about 0.95, and has repeat units from about 95 mol % terephthalic acid, about 5 mol % isophthalic acid and 100 mol % 1,4-cyclohexanedimethanol. Extruded films (~25-30 mil) are then prepared from the blend using a Brabender extruder with a mixing screw. The films are cut into 3×12 inch pieces and the pieces are precrystallized at 175° C. for 10 minutes (to avoid distortion of the film during oven aging). The films are placed on a rotating carousel in a forced-air oven at 400 and 450° F. for intervals up to 90 minutes. The color change of the aged samples is measured using a Gardner Colorimeter. The relative brittleness of the samples is determined by flexing the samples manually through a 180 degree radius. All examples except Example 1 include 0.5% titanium dioxide. Examples 1-5 are controls. Example 6 is in accordance with this invention.

| Example | Oven Aged at 450° F. | | | | | |
|---|---|---|---|---|---|---|
| | 0 Min. | | 60 Min. | | 90 Min. | |
| | Color | Rating | Color | Rating | Color | Rating |
| 1. Polyester A | 1 | P | 8 | F | 10 | F |
| 2. Polyester A + 0.1% Hindered Phenol | 2 | P | 8 | F | 9 | F |
| 3. Polyester A + 0.1% Hindered Phenol + 0.3% DSTDP | 1 | P | 2 | P | 3 | F |
| 4. Polyester A + 0.1% Hindered Phenol + 0.1% Naugard P + 0.3% DSTDP | 1 | P | 4 | F | 4 | F |
| 5. Polyester A + 0.3% Hindered Phenol + 0.3% Naugard P + 0.3% DSTDP | 2 | P | 5 | P | 6 | F |
| 6. Polyester A + 0.2% Hindered Phenol + 0.04% CaHPO4 + 0.3% DSTDP | 1 | P | 2 | P | 2 | P |

P = Pass; film remained ductile
F = Fail; film became brittle
Color scale; 1 = best 10 = worst Example 6 shows the CaHPO4 is effective for stabilizing Polyester A against thermal breakdown and color change after oven aging at 450° F.

Whenever the term "inherent viscosity" (I.V.) is used in this application, it will be understood to refer to viscosity determinations made at 25° C. using 0.5 gram of polymer per 100 ml of a solvent composed of 60 wt % phenol and 40 wt % tetrachloroethane.

Gardner CDM values are measured on a Gardner color difference meter using ASTM D-2244.

Materials referred to by trademark are described as follows:

Irganox 1010 antioxidant (hindered phenol) tetrakis[-methylene-3-(3′,5′-di-tert-butyl4′-hydroxyphenyl)propionate] methane Naugard P antioxidant -[tris(nonylphenyl) phosphite]

DSTDP - distearyl thiodipropionate

The "melting point" ($T_m$) of the polymers described in this application are readily obtained with a Differential Scanning Calorimeter.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:
1. A shaped, thin-walled, thermoformed, heat-set article, the composition of which comprises:
   (a) a crystallizable polyester having repeating units from at least 85 mol % terephthalic acid and repeating units from at least 90 mol % 1,4-cyclohexanedimethanol, the total dicarboxylic acid mol % and the total glycol mol % each being 100 mol %, said polyester having an inherent viscosity of about 0.7-1.1, and (b) a heat stabilizing amount of an antioxidant system compriisng about 0.05 to 2% of a hindered phenol, about 0.05 to 1.0% of a thio ether or ester and about 0.01 to 0.20% of a phosphate salt, all based on the weight of the article.

2. The article according to claim 1 wherein said polyester contains repeating units from about 85-100 mol % terephthalic acid, repeating units from about 15-0 mol % isophthalic acid and repeating units from substantially 100 mol % 1,4-cyclohexanedimethanol.

3. The article according to claim 1 wherein said polyester has an inherent viscosity of about 0.87-1.1.

4. The article according to claim 1 which further comprises about 0.01% to about 20%, based on the total weight of the article, of a nucleating agent.

5. The article according to claim 1 wherein said antioxidant comprises 1,3,5-trimethyl-2,4,6-tris(3,5-di-t-butyl-4-hydroxybenzyl)benzene or tetrakis[methylene-3-(3',5'-di-teret-butyl-4'-hydroxyphenyl)propionate] methane 6. The article according to claim 1 wherein said antioxidant comprises a hindered phenol of the general formula

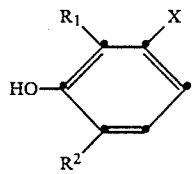

wherein $R_1$ is a branched alkyl group containing 3-20 carbon atoms, $R_2$ is H or a straight or branched alkyl group containing 1 to 20 carbon atoms, and X is an alkyl group or an electron donating group.

7. An article according to claim 1 wherein said antioxidant comprises
   (a) 1,3,5-trimethyl-2,4,6-tris-(3,5-di-t-butyl-4-hydroxybenzyl)benzene,
   (b) calcium phosphate, sodium phosphate or potassium phosphate, and
   (c) di-lauryl thiodipropionate or di-stearyl thiodipropionate.

8. An article according to claim 1 wherein said antioxidant comprises
   (a) tetrakis [methylene-3-(3',5'-di-tert-butyl-4'-hydroxyphenyl) propionate] methane.
   (b) calcium phosphate, sodium phosphate or potassium phosphate, and
   (c) di-lauryl thiodipropionate or di-stearyl thiodipropionate.

9. A shaped, thin-walled, thermoformed, heat-set article, the composition of which comprises:
   (a) a crystallizable polyester having repeating units from about 90-99 mol % terephthalic acid, repeating units from about 10-1 mol % isophthalic acid and substantially 100 mol % 1,4-cyclohexanedimethanol, the total dicarboxylic acid mol % and the total glycol mol % each being 100 mol %, said polyester having an inherent viscosity of about 0.87-1.1,
   (b) about 0.05-2.0%, based on the total weight of the article, of an antioxidant system which consists essentially of
      (1) a hindered phenol selected from the group consisting of 1,3,5-trimethyl-2,4,6-tris (3,5-di-t-butyl-4-hydroxybenzyl)benzene tetrakis [methylene-3-(3',5'-di -tert-butyl-4'-hydroxyphenyl) propionate] methane
      (2) calcium phosphate, sodium phosphate, or potassium phosphate
      (3) dilauryl thiodipropionate or distearyl thiodipropionate, and
   (c) about 0.01% to about 20%, based on the total weight of the article, of a nucleating agent.

* * * * *